Oct. 8, 1940.  G. E. ROFF  2,217,136
ANIMAL TRAP
Filed April 18, 1940  3 Sheets-Sheet 3
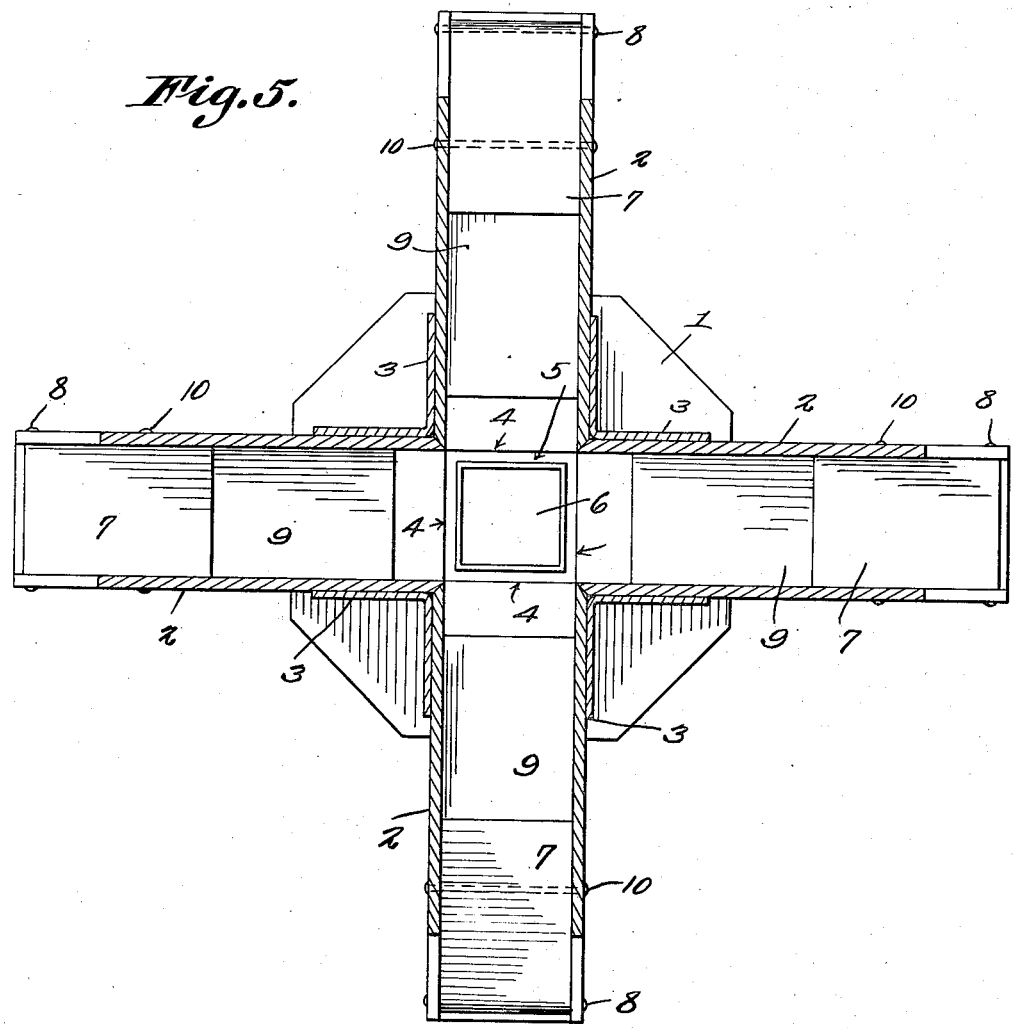
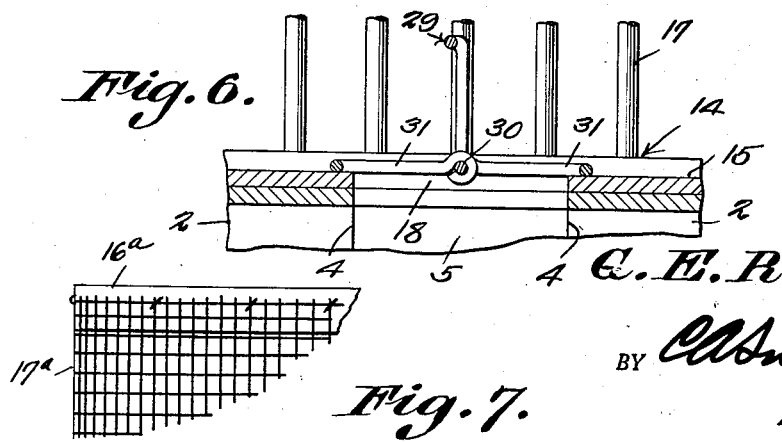
G. E. Roff
INVENTOR.
BY C. A. Snow & Co.
ATTORNEYS.

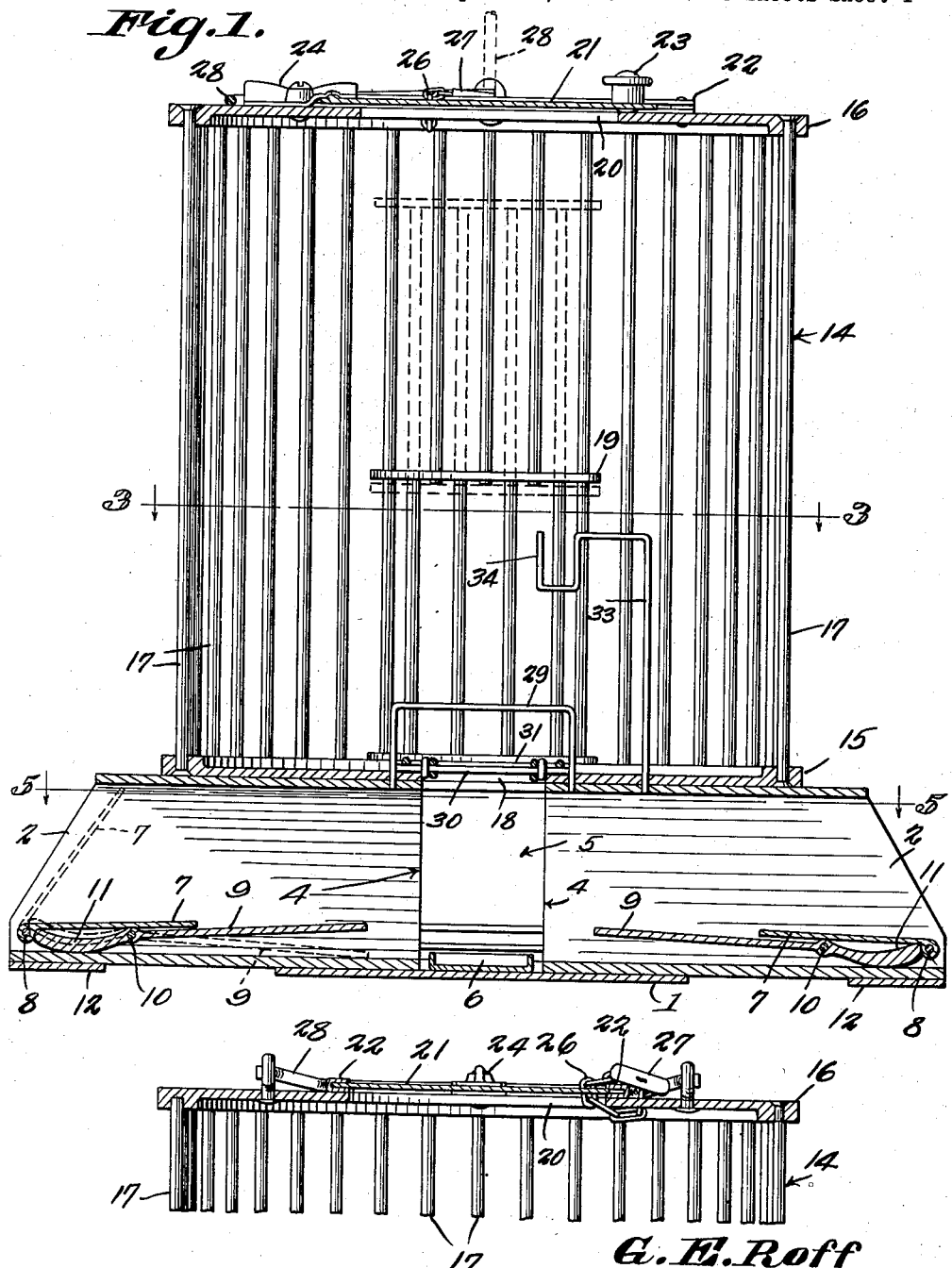

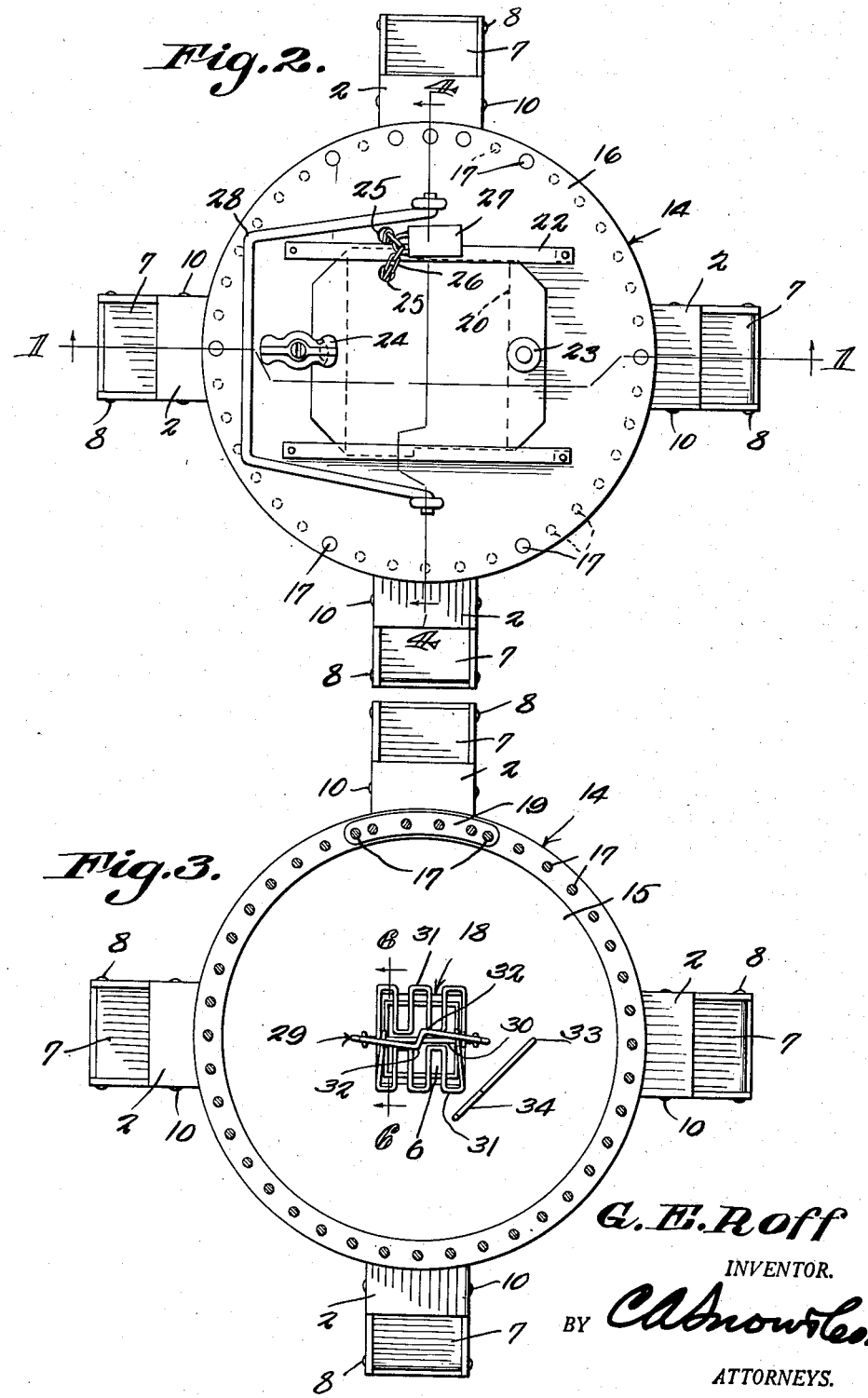

Patented Oct. 8, 1940

2,217,136

UNITED STATES PATENT OFFICE 2,217,136

ANIMAL TRAP

George E. Roff, Goodland, Kans.

Application April 18, 1940, Serial No. 330,397

3 Claims. (Cl. 43—67)

The device forming the subject matter of this application is an animal trap, and one object of the invention is to provide means whereby animals will be held against retreat from a bait chamber beneath a cage, means being provided whereby animals may pass from the bait chamber into the cage and be prevented from passing back from the cage into the bait chamber.

Another object of the invention is to provide a novel structure for supporting and limiting the movement of the gates which control the passage from the bait chamber into the cage.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 is a vertical section, on the line 1—1 of Fig. 2, showing a trap constructed in accordance with the invention;

Fig. 2 is a top plan;

Fig. 3 is a horizontal section on the line 3—3 of Fig. 1;

Fig. 4 is a vertical section on the line 4—4 of Fig. 2, parts being omitted;

Fig. 5 is a horizontal section on the line 5—5 of Fig. 1;

Fig. 6 is a section on the line 6—6 of Fig. 3;

Fig. 7 is an elevation showing a modification.

The trap forming the subject matter of this application comprises a body, including a base plate 1, to which is secured a plurality, for example four, radially disposed entrance tunnels 2. The inner portions of adjacent tunnels 2 are connected by angular reenforcements 3.

The inner portions of oppositely disposed tunnels 2 are spaced apart, as shown at 4, to form a central chamber 5, in which is located a bait pan 6, supported on the base plate 1.

The lower ends of doors 7 are mounted on pivot elements 8 carried by the tunnels 2 close to the outer ends thereof. Figure 1 shows that the doors 7 are high enough so that they will engage the upper parts of the tunnels 2, before the doors reach a vertical position, and the doors, therefore, tend to drop inwardly by gravity. Treadles 9 are located in the tunnels 2 and are mounted intermediate their ends on pivot members 10, carried by the tunnels. The outer ends of the treadles 9 are thickened, as shown at 11, so that those ends of the treadles tend to swing downwardly. The outer ends 11 of the treadles 9 are disposed below the doors 7, close to the pivotal mountings 8 of the doors and above spacers 12 secured to the under surfaces of the tunnels 2, near the outer ends of the tunnels, and making up for the thickness of the base plate 1, in the support of the tunnels.

A vertically elongated cage 14 is secured to the upper surfaces of the tunnels 2. The cage 14 includes a bottom 15 and a top 16, connected by a grating which may include rods 17. The rods 17 are used only in connection with traps for taking large animals. In connection with traps for the capture of smaller animals, the structure of Fig. 7 may be resorted to, wherein a wire netting 17a is shown as connected to the top 16a of the cage. The bottom 15 of the cage has an opening 18, communicating with the bait chamber 5.

Access is had to the cage 14 either through a vertically slidable door 19 carried by certain of the rods 17, or through an opening 20 in the top of the cage, as desired.

The opening 20 in the top 16 of thce cage 14 is controlled by a slidable closure 21, mounted to slide in guides 22 on the top 16 of the cage 14. The closure 21 is supplied at one end with a handle 23. A button 24 is pivoted to the top 16 of the cage, and, overlapping the opposite end of the closure 21, aids in holding it down.

In order to keep the closure 21 from being slid accidentally into an open position, the closure and the top 16 of the cage have cooperating keeper openings 25, through which may be passed a chain 26, engaged with a padlock 27. If the trap is of portable size, it may be carried about by means of a bail or handle 28, pivotally mounted on the cage top 16.

The bottom bar 30 of a vertical loop-shaped member 29 is secured to the bottom 15 of the cage 14 and extends across the hole 18. On the bottom bar 30 of the member 29 are pivoted open-work gates 31 that rest normally on the bottom 15 and close the hole 18. The top bar of the member 29 is offset laterally, in opposite directions, as shown at 32, so that after an animal has raised one of the gates 31, the said gate, engaging the offset part 32 of the member 29, will tend to drop back into the closed position of Fig. 6. An upstanding bait carrier 33 is mounted in the cage bottom 15, at one end of the loop-shaped member 29 and includes a hook 34, visible through the hole 18 in the bottom 15 of the cage 14.

Enticed by the bait in the pan 6, an animal enters one of the tunnels 2 and steps on the inner end of the corresponding treadle 9, the cooperating door 7 will be closed. If the animal attempts to escape by one of the other tunnels, he treads on the inner end of a treadle 9, the door 7 is closed, and escape is impossible.

From the central chamber 5, the animal is lured into the cage 14 by bait suspended from the hook 34 of the bait carrier 33. As the animal passes into the cage 14, he raises one of the gates 31, which closes behind him. The upwardly movable gate means 31 guards the opening 18, the gate means constituting a barrier against retreat from the cage 14 into the bait chamber 5, by way of the opening 18, the gate means being upwardly movable under the efforts of an animal, to permit passage from the bait chamber to the cage. Several animals thus may be accumulated in the cage 14. They may be taken out of the cage 14 either by way of the sliding door 19, or by means of the closure 21.

The device, depending on its size, may be used for large animals or for small animals. The trap may be concealed to the extent desired, that being a trapper's expedient.

What is claimed is:

1. In an animal trap, a base comprising a plurality of substantially radial tunnels, the inner ends of adjoining tunnels being connected together and the inner ends of oppositely-disposed tunnels being spaced to form a bait chamber, pivotally mounted doors and pivotally mounted treadles in the tunnels, the treadles constituting means for closing the doors, a cage superposed on the base and having an opening communicating with the bait chamber, a pivotally mounted gate controlling the opening, and means within the cage for holding bait in such position that it will be visible from the bait chamber.

2. In an animal trap, a cage having an opening in its bottom, means for confining an animal initially below the opening, a loop-shaped member carried by the bottom of the cage and including upper and lower parts, upwardly opening gates controlling the opening and pivotally mounted on the lower of said parts, the upper of said parts having oppositely extended projections which, cooperating with the gates, limit their opening movement to positions in which they will move by gravity to closed positions.

3. In an animal trap, a base comprising a plurality of substantially radial tunnels, there being a bait chamber at the inner ends of the tunnels, pivotally mounted doors and pivotally mounted treadles in the tunnels, the treadles constituting means for closing the doors, a cage superposed on the base and having an opening communicating with the bait chamber, and gate means guarding the opening, the gate means constituting a barrier against retreat from the cage into the bait chamber by way of the opening, the gate means being upwardly movable under the efforts of an animal, to permit passage from the bait chamber to the cage.

GEORGE E. ROFF.